May 19, 1931.   T. B. LYLES   1,806,403
SAFETY APPLIANCE FOR AIRPLANES
Filed July 19, 1930   3 Sheets-Sheet 1

INVENTOR
Thomas B. Lyles
By W. W. Williamson
Atty.

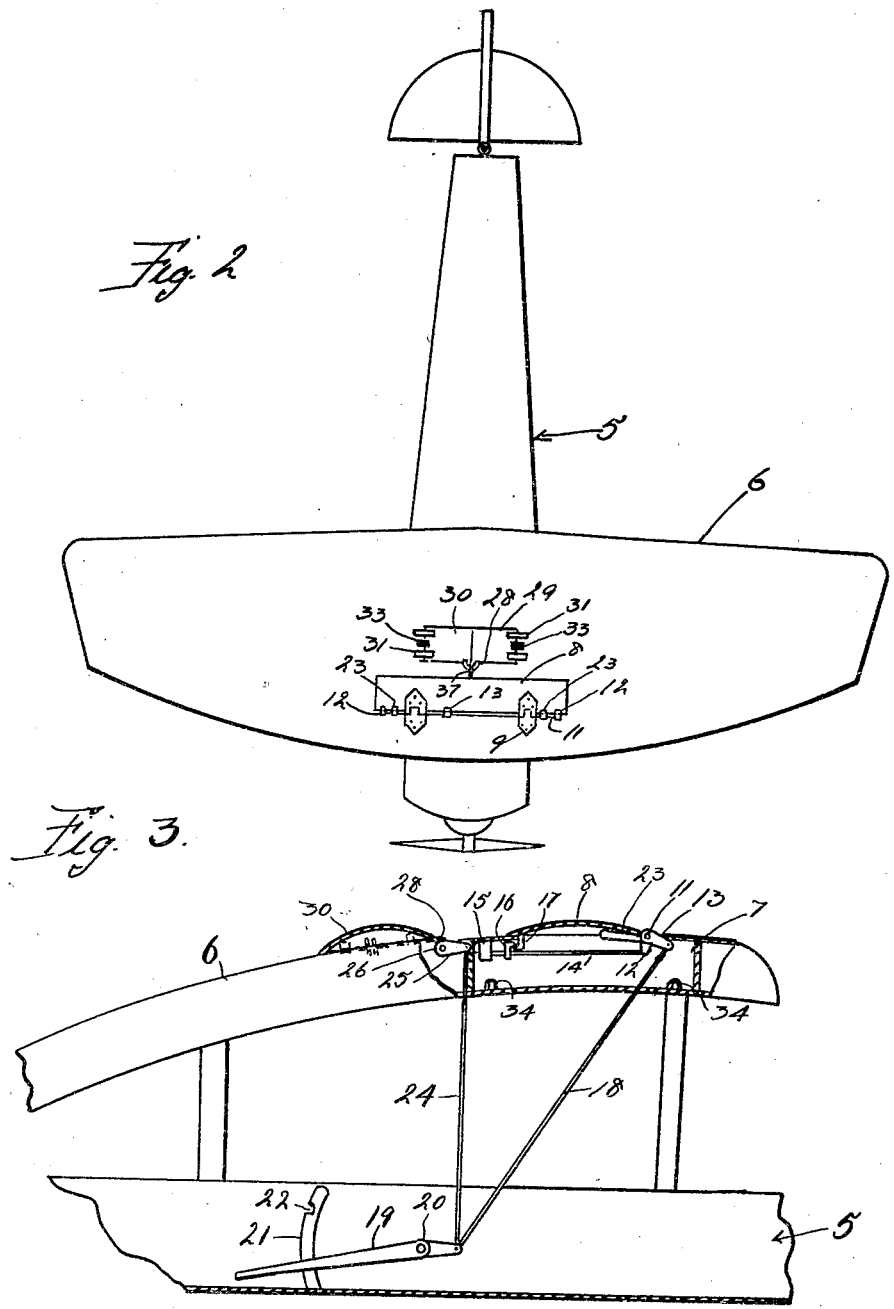

May 19, 1931. T. B. LYLES 1,806,403
SAFETY APPLIANCE FOR AIRPLANES
Filed July 19, 1930 3 Sheets-Sheet 3

INVENTOR
Thomas B. Lyles
By W. W. Williamson
Atty.

Patented May 19, 1931

1,806,403

UNITED STATES PATENT OFFICE

THOMAS B. LYLES, OF TERRE HAUTE, INDIANA

SAFETY APPLIANCE FOR AIRPLANES

Application filed July 19, 1930. Serial No. 469,042.

My invention relates to new and useful improvements in a safety appliance for airplanes and the primary object of the invention is to provide a device of this character which will lower a plane to the ground without destroying or damaging said plane and eliminating the necessity of the pilot or inexperienced passengers from having to jump in case of accident.

Another object of the invention is to provide for housing the parachute structure, preferably comprising two parachutes, within the wing structure of the airplane.

Another object of the invention is to provide for closing the compartment housing the parachutes in order to reduce to a minimum the friction of the air on the housing.

Another object of the invention is to provide a housing compartment for each parachute of the parachute structure, each compartment being closed by separate closure means.

A further object of the invention is to provide mechanism to be manually operated for simultaneously unlatching the closures for the two compartments.

A still further object of the invention is to provide means for quickly opening the closure of the small compartment which houses the smaller or pilot parachute.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 2 is a plan view of the airplane with the parachutes enclosed within their respective housings or compartments.

Fig. 3 is an enlarged fragmentary end elevation of the airplane with portions broken away and shown in section to illustrate the details of construction of the compartments and their closures and the mechanism for unlatching said closures.

Figure 1:
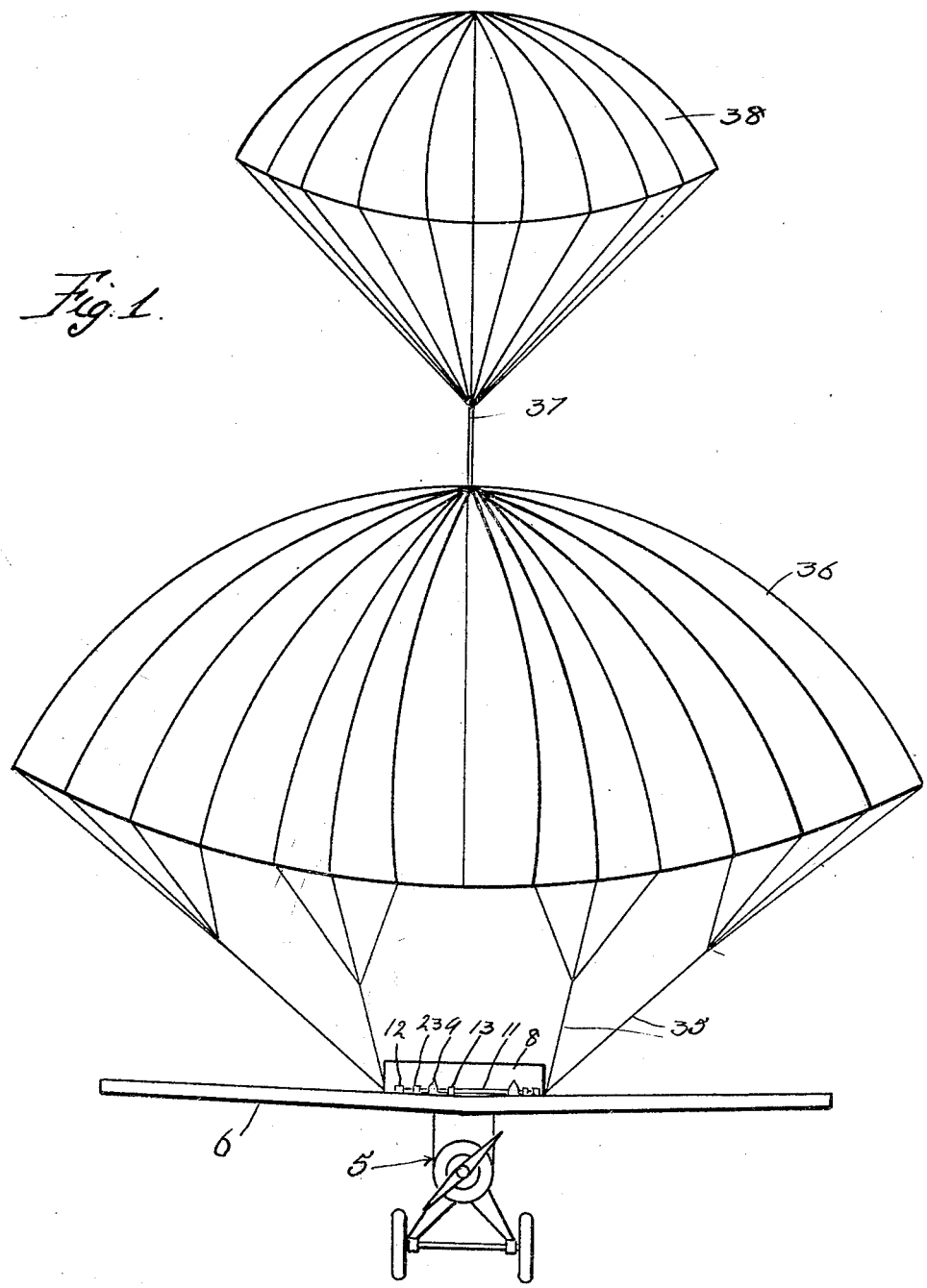
Fig. 1 is a front elevation of an airplane conventionally illustrated showing the parachutes in open positions as they would appear when lowering an airplane to the ground.

In carrying out my invention as herein embodied, 5 represents an airplane including a wing structure 6 in which is formed a compartment 7 for the main parachute between the upper and lower skins of the wing structure, preferably at a point midway the ends of the wing structure over the body of the airplane and preferably adjacent the forward edge of the wing structure, although this latter position will be regulated to a considerable extent by the center of gravity of the airplane as a whole.

The top of the compartment 7 is open to provide for placing the main parachute therein and to permit its exit when necessary or desirable, but said open end is normally closed by a cover or closure 8 hinged at its forward edge to the top of the wing structure by means of hinges 9 and through the hinges pass the shaft 11.

On the shaft 11 preferably at or near the ends thereof are mounted the arms 12 and 13 of bell crank levers, said arms of each bell crank lever being formed integral or separate from each other as desired and the arm 12 of each bell crank lever has one end of a bolt rod 14 connected thereto which is slidably mounted in a suitable bearing 15 and carries a latch 16 for coaction with a catch 17 depending from the closure 8. To the other arm 13 of each bell crank lever is attached one end of a connecting rod 18 while the other end of the latter is attached to the outer end of an operating lever 19 pivoted at 20 within the body or cockpit of the airplane in a position whereby the handle end of said operating lever is within easy reach of the pilot or operator of the airplane. The operating lever also coacts with the holding member 21 which has a notch 22 to receive a part of the operating lever to hold said operating lever in that position at the end of a stroke for disconnecting the latches 16 from the catches 17.

On the shaft 11 are also mounted lifting arms 23 which engage the under side of the closure or cover 8 to raise the latter after the cover has been unfastened and therefore when said cover is in closed position, the lifting arms 23 are slightly below said cover.

To the outer end of the operating lever is also attached one end of another connecting rod 24 while the opposite end thereof is attached to an arm 25 which in turn is fixed to a shaft 26 journalled in suitable bearings 27 and carrying a bifurcated or dual latch 28 rotatable with the shaft 26.

The latch 28 co-operates with the closure for the second compartment which houses the pilot parachute and said closure preferably comprises two endwise opening covers 29 and 30 so that their free ends meet or are contiguous to each other and both of said covers can be held in closed position by means of the dual latch 28. These covers are hinged at their outer ends to the top of the wing structure by hinges 31 and the pair of hinges for each door preferably has a shaft 32 running through them and acting as the hinge pintle and said covers are normally moved to open positions by suitable springs 33 arranged in any desirable or convenient manner, the ones herein illustrated being merely to make plain one manner in which the said covers can be made spring operative. The chamber, compartment or housing for the pilot parachute is, in reality, formed by the covers 29 and 30 up on top of the wing structure, as plainly shown in Fig. 3, the said covers being of arcuate formations transversely.

At some suitable place on the airplane and preferably on the wing structure and also preferably within the compartment 7 for the main parachute are fixed suitable eyes 34 to which the shroud lines 35 of the main parachute 36 are attached and at the center of the main parachute is fastened the shroud lines 37 of the pilot parachute 38.

The main parachute is folded and placed within the compartment 7, said folding being so arranged that the top thereof where the shroud lines 37 of the pilot parachute 38 are attached to said main parachute 36 will be on top of the bundle thus formed, while the shroud lines 35 of the said parachute 36 will be underneath of such bundle.

The pilot parachute 38 is then folded in such a manner that when lying upon the top of the wing structure, the current of air produced by the forward movement of the airplane will readily catch said pilot parachute and cause it to open. When the parachutes are in their folded conditions as set forth above, the closures or covers are closed down or shut and latched in place by moving the operating lever 19 into the position shown in Fig. 3 at which time the noses of the latches 16 will be moved into engagement with the catches 17 and simultaneously the dual latch 28 will be moved into engagement with the covers 29 and 30 adjacent their meeting ends and thus the covers or closures will be held closed until such time as is necessary or desirable to use the parachutes.

Figure 4:
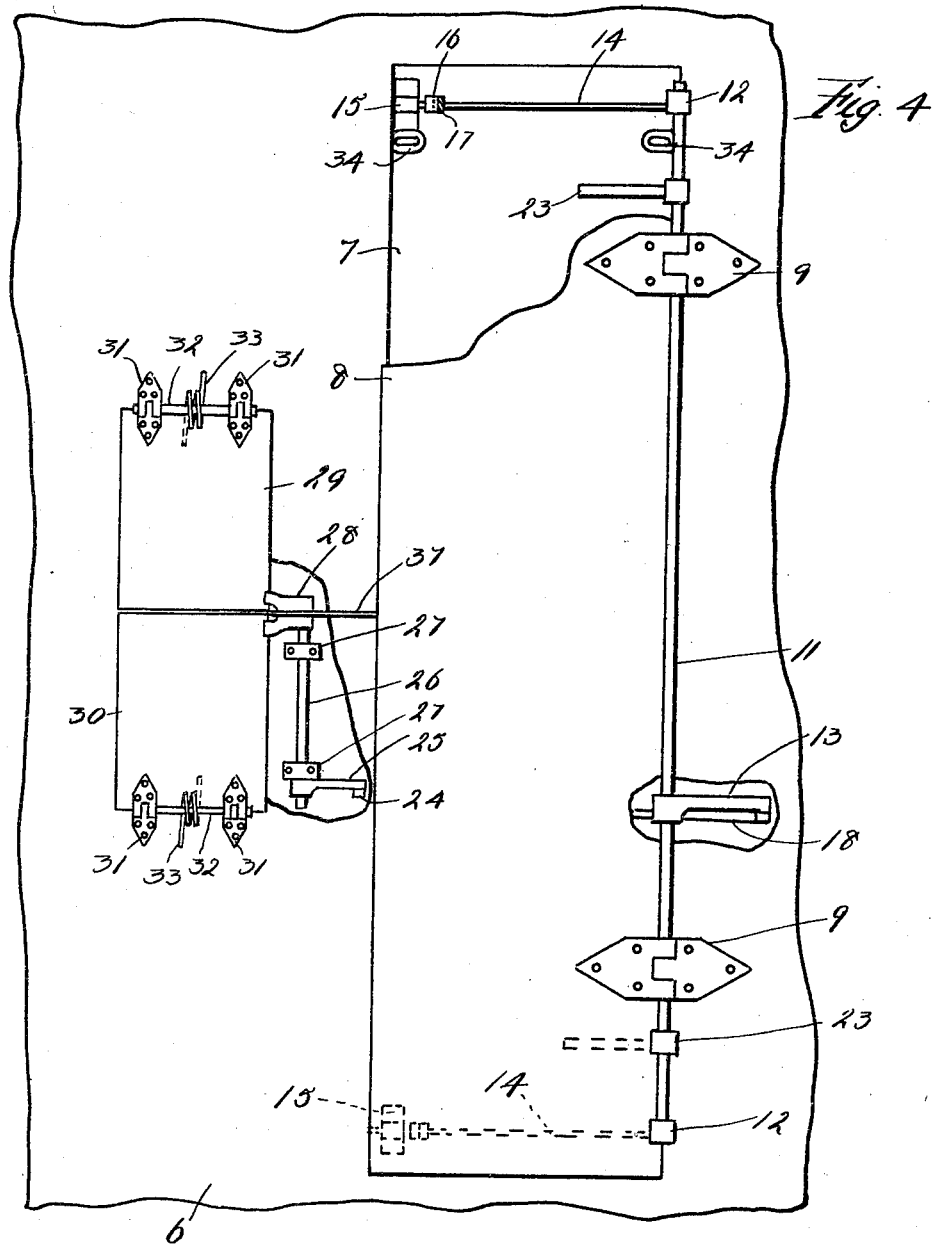
Fig. 4 is an enlarged fragmentary plan view of the wing structure of the airplane in the region of the compartments housing the parachutes with parts broken away to show details of construction of the mechanism.

When the desire or necessity arises to use the parachutes the operating lever 19 is actuated in the proper direction to disengage the latches, and the covers 29 and 30 will be immediately opened to their fullest extent by the springs 33 and preferably the configuration and construction of the covers 29 and 30 is such that when they are opened, they will be thrown well back out of the way of the parachutes and preferably to the top of the wing structure and approximately in positions directly opposite to the positions shown in Fig. 4 where they are closed. This will permit the pilot parachute to be blown off the top of the wing structure and opened during the time the closure or cover 8 from the main parachute chamber is being opened which has to be done manually by the complete operation of the operating lever 19 until the latter reaches some position such as that indicated by the nuts 22 in the holding member 21.

By reference to Fig. 4, in particular, it will be noted that a part of the shroud line 37 of the pilot parachute passes over the outside of the wing structure from the compartment for said pilot parachute to the compartment 7 for the main parachute.

When the necessity arises for the use of the parachute, the operating lever is pulled, thereby opening the closures or covers and as soon as the pilot parachute opens, it will begin drawing the main parachute out of the compartment housing said main parachute and as soon as the shroud lines of the said main parachute are taut, this will open up and the airplane will be slowly lowered to the ground in an upright position without damage to the airplane structure or injury to its occupants.

Of course I do not wish to be limited to the exact details of construction as herein shown, as these may be varied within the limits of the appended claims without departing from the spirit of my invention.

Having thus fully described my invention, what I claim as new and useful is:—

1. A safety appliance for airplanes including the wing structure of an airplane, a compartment within the wing structure open at the top, a closure hinged to the wing structure for normally closing said compartment, covers hinged to the top of the wing structure to the rear of the compartment and forming a chamber for a pilot parachute, means to normally open said covers, a main parachute having its shroud lines attached to the airplane and adapted to be folded within the compartment, a pilot parachute having its shroud lines connected with the center of the main parachute and said pilot parachute adapted to be folded and set on top of the wing structure in the region of the covers to the rear of the compartment, and means to hold the covers and closure in closed positions, and means to actuate the closure and cover holding means.

2. In a safety appliance for airplanes, an airplane wing structure having a compartment therein to receive and hold a main parachute in folded condition, said parachute having shroud lines attached to the airplane, a cover to close the upper open end of the compartment, means to normally hold said cover in a closed position, said means being manually operative for releasing the cover, a pilot parachute connected with the main parachute and adapted to be folded and laid upon the top of the wing structure to the rear of the cover closing the main parachute compartment, means to temporarily hold said pilot parachute in position in folded condition, means to normally hold the pilot parachute holding means in a holding position, said second holding means being manually operative for releasing the pilot parachute holding means, and means to open the pilot parachute holding means upon release thereof.

3. The structure set forth in claim 2 in combination with an operating lever, connecting rods for connecting said operating lever with the manually operative holding means, and means associated with the operating lever to hold it in a position to which it is moved for releasing the manually operative holding means.

4. In a device of the kind described, an airplane, a compartment formed in the wing structure of said airplane and open at its upper end, a cover, hinges including a shaft passing therethrough for hingedly connecting the forward edge of said cover to the top of the wing structure, catches depending from the rear edge of the cover, arms carried by the shaft, bolt rods connected with said arms, latches fixed to said bolt rods for co-operation with the catches for holding the cover in a closed position, lifting arms fixed to said shaft and underlying the cover for raising the latter when the shaft is rotated in the proper direction, another arm fixed to the shaft and operating lever, a connecting rod attached to said lever and to the last mentioned arm whereby movement of said operating lever will release the cover and lift the same, a pair of covers hinged to the top of the wing structure to the rear of the first mentioned cover, springs to normally open said covers, said covers when closed forming a compartment for a pilot parachute, a shaft, a dual latch fixed to said shaft for co-operation with the last mentioned covers to hold them in a normal closed position, an arm fixed to said shaft, a connecting rod connected with said arm and the operating lever whereby motion will be transmitted to the last named shaft when the operating lever is actuated, the operation of both sets of latches being simultaneous, a main parachute having its shroud lines attached to the airplane and said main parachute adapted to be folded in the compartment within the wing structure, and a pilot parachute having its shroud lines connected to the main parachute, said pilot parachute adapted to be folded up on top of the wing structure and held in place by the spring actuated covers.

5. In a device of the kind described, an airplane, a main parachute secured to the airplane and adapted to be housed within the wing structure, a pilot parachute connected with the main parachute and adapted to rest upon the wing structure to the rear of the main parachute, means normally covering said parachutes to prevent them from being affected by currents of air and means to hold the covering means normally in closed positions and releasable manually to permit the pilot parachute to be affected by air currents and to permit the main parachute to be withdrawn from its housing by the pilot parachute.

In testimony whereof, I have hereunto affixed my signature.

THOMAS B. LYLES.